Figure 1:
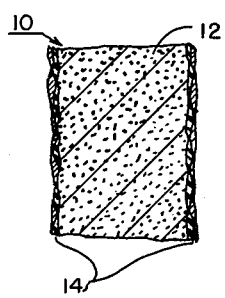

July 23, 1963

W. G. TASCHEK 3,098,772

ELECTRODE FOR FUEL CELL

Filed June 1, 1962

INVENTOR,
WALTER G. TASCHEK.

BY Harry M. Saragovitz

ATTORNEY.

3,098,772
ELECTRODE FOR FUEL CELL
Walter G. Taschek, Long Branch, N.J., assignor to the United States of America as represented by the Secretary of the Army
Filed June 1, 1962, Ser. No. 199,547
5 Claims. (Cl. 136—120)
(Granted under Title 35, U.S. Code (1952), sec. 266)

The invention described herein may be manufactured and used by or for the Government for governmental purposes, without the payment of any royalty thereon.

This invention relates to the method of preparing a carbon electrode for use in a fuel cell using an acid electrolyte, to a carbon electrode so prepared, and to a fuel cell unit including the prepared carbon electrode.

A fuel cell is a continuous-feed electrochemical device in which the chemical energy of the reaction of a conventional fuel and air (oxygen) is converted directly into useful electricity. In the case where carbon or a carbonaceous material is oxidized electrochemically with oxygen or air, the system is classified as a direct fuel cell. In the case where a reactant, derived from carbonaceous material with only small energy losses, is oxidized electrochemically, the system is classified as an indirect fuel cell.

The potentialities offered by such batteries are, first, the possibility of constructing electrical power sources with overall efficiencies higher than those obtained from existing devices; second, the possibility of obtaining portable batteries with energy outputs per unit of weight and volume higher than that obtained from chemical batteries presently available; and third, the possibility to design continuously fed batteries in which the cell reactants can be regenerated from the reaction products on a continuous basis, either thermally, radiochemically, or photochemically.

An example of a direct fuel cell that has been investigated is the hydrogen-oxygen cell which oxidizes the fuel hydrogen to water. In such a cell, the electrodes are generally constructed of porous carbon which has been activated (fired in a carbon dioxide atmosphere), platinized, and then wet proofed. The electrolyte used is strongly alkaline, containing potassium hydroxide as the major component. In operation of the cell, hydrogen and oxygen gas are fed through hollow tubes, reaching the active electrode surface by diffusion through the carbon wall. At the hydrogen electrode, hydrogen atoms react with hydroxyl ions to form water, releasing an electron to the external circuit. At the oxygen electrode, oxygen molecules accept electrons from the external circuit to form peroxyl ions. The peroxide is decomposed by catalysts in the electrode, forming water and oxygen, which is reduced to peroxyl ions as rapidly as it is formed.

Though the coulometric efficiency of the above cell is high, this efficiency falls off when an acid electrolyte is used rather than a strongly alkaline electrolyte. The use of an acid electrolyte in a fuel cell is desirable because in the utilization of hydrocarbons or partially oxidized hydrocarbon fuels, a reaction product is carbon dioxide which in turn reacts chemically with the alkaline electrolyte. The problem of creepage and associated difficulties involved in working with strongly alkaline materials are also obviated by the use of an acid electrolyte.

Accordingly, an object of this invention is to prepare a high drain electrode for a fuel cell using an acid electrolyte. A further object is to prepare a fuel and oxygen electrode that will give superior performance when the electrodes are used in acid media.

It has now been found that the above objectives can be attained and a fuel cell unit made such as the hydrogen-oxygen cell above mentioned that will perform well when using an acid electrolyte. This result is brought about by preparing the carbon electrodes to be used in the fuel cell in a special manner. Briefly, the preferred method of preparing the carbon electrodes involves the steps of activation by firing the carbon electrode in a carbon dioxide atmosphere at 800° C., wet proofing the fired electrode, and then platinizing the wet proofed electrode.

Particularly, in the initial firing step, each electrode is weighed before firing. The electrodes are then fired in a carbon dioxide atmosphere at about 800° C. for eight minutes; then cooled and reweighed to calculate weight loss. A total weight loss of 7 to 10% is desirable. Firing increases the pore size and surface area of the carbon, the weight loss being caused by the burning off of carbon.

In the wet proofing step, a standard wet proofing solution is first prepared using one gram of paraffin per 100 ml. of petroleum ether. The activated electrodes are dusted off and then inserted in the solution for one-half hour. The electrodes are then dried with a vacuum pump for at least twelve hours to insure a dry pore structure.

In platinizing, a chloroplatinic acid solution containing about 90 mg. of platinum per ml. of solution is prepared. After the wet proofed electrodes have been heated in an oven at 200° C. for two hours, the solution is applied on the hot electrode with a small brush as evenly as possible so that one square centimeter of electrode area contains 2 mg. of platinum. The electrodes are then placed in a vacuum oven at 200° C. for six hours.

The carbon electrode prepared in the above described manner is believed to consist of a porous paraffin film substantially covering the carbon with finely divided platinum dispersed over the paraffin film. The actual form that the deposited paraffin and platinum take in the pores of the carbon is not presently known.

Figure 2:
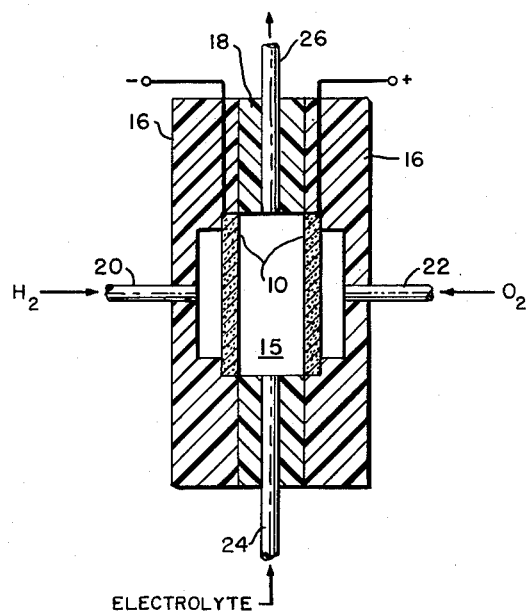

For a better understanding of the invention, together with other and further objects thereof, reference is had to the following description taken in connection with the accompanying drawing in which:

FIG. 1 is a schematic representation of the prepared carbon electrode according to the invention; and FIG. 2 is a schematic diagram of a fuel cell unit using a hydrogen-oxygen system with an acid electrolyte and including the prepared carbon electrode according to the invention.

In FIG. 1 of the drawing, 10 is a carbon electrode prepared according to the preferred method of the invention from a piece of carbon 12, having dimensions of 1 inch x 1 inch x 0.25 inch. The unprepared carbon 12 has a density of 1.35 gm. per cc., a resistivity of 0.0035 ohm per cubic centimeter, a porosity of .331 cc. per gm. at a pore diameter of 10 to 0.8 microns, and a surface area of 3.54 square meters per gram. 14 in FIG. 1 is a schematic representation of what is believed to be a porous paraffin film substantially covering the carbon with finely divided platinum dispersed over the paraffin film.

It is believed that in the technique used to prepare carbon electrodes for use with an alkaline electrolyte in which wet proofing is the last step, there is a tendency for the wet proofing to mask the surface area outer pore structure and catalytic sites. It is further believed that the method of the present invention improves over that technique in that the prepared electrode has the maximum area obtainable with a wet proofed electrode and the maximum available catalytic sites.

In FIG. 2, the prepared carbon electrodes 10 are placed side by side and separated by the electrolyte chamber 15. The electrodes and electrolyte chamber are enclosed in a three compartment housing made of Lucite plastic and having two outer compartments 16, and an intermediate compartment 18. A channel 20 is utilized for introducing fuel in the form of hydrogen gas into the cell through an end face of the reducing electrode 10. Similarly, the channel 22 is utilized for the purpose of introducing oxygen into the cell through an end face of the oxidizing electrode 10. Channel 24 connects with one end of the electrolyte chamber 15 in order to introduce acid electrolyte into the electrolyte chamber. Channel 26 connects to the other end of the electrolyte chamber 15 in order to carry a mixture of acid electrolyte and cell reaction products out of the electrolyte chamber.

In operating the cell, three normal sulfuric acid is caused to pass continuously through channel 24 into electrolyte chamber 15. At the same time, hydrogen is caused to pass through channel 20 toward a face of one of the prepared carbon electrodes 10, and oxygen caused to pass through channel 22 toward a face of the other prepared carbon electrode 10. The resulting reaction causes a current to flow through the prepared carbon electrodes 10 and an external circuit as indicated by the leads drawn in the figure. The cell is capable of producing current drains of 30 ma./cm.$^2$ for 60 hours of intermittent operation (8 hours per day) at half open circuit voltage (0.435 volt) which is a potential commonly used to rate fuel cell performance. When using carbon electrodes prepared for use with an alkaline electrolyte in which wet proofing is the last step, that is, by the steps of activation, platinizing, and finally wet proofing the carbon electrode, the cell produced only 3 ma./cm.$^2$ at half open circuit potential (0.355 volt) with three normal sulfuric acid as the electrolyte.

A comparison of the two methods of preparing carbon electrodes indicates that the activation times and temperatures, wet proofing solutions, and catalyst concentrations and application temperatures are essentially the same for both preparing carbon electrodes for use with an alkaline electrolyte and for preparing carbon electrodes according to the method of this invention. The significant difference between the methods lies in the sequence in which each step is placed. In preparing carbon electrodes for use with an alkaline electrolyte, wet proofing with an appropriate agent is the final step. In this invention, catalyzing the carbon electrode, previously wet proofed, is the final step.

The foregoing description is to be considered merely as illustrative of a preferred embodiment of the invention. Various modifications however, may be made therein.

For example, in the initial firing step in preparing the carbon electrode, various materials that provide an oxidizing atmosphere can be used instead of carbon dioxide. These materials include water vapor and carbon monoxide. The important criteria is that the particular material selected provide an oxidizing atmosphere for controlled oxidation of the carbon.

The particular carbon used for the electrode should be of rigid structure. Any of the variously marketed baked carbons are to be considered as operable when prepared according to the method of the invention.

The type of wet proofing material used will depend on its electro-chemical properties, that is, the conductivity of the resulting film, the ability of the film not to mask the surface area of the carbon, and the stability of the film. It is contemplated that various organic polymer type materials such as Teflon and polyethylene would be operable as wet proofing materials.

The fuel cell unit in which the prepared carbon electrode is used is operated with an acid electrolyte that provides a high concentration of H$^+$ ions. Thus, the use of inorganic acids such as phosphoric, hydrochloric, hydrofluoric, hydrobromic, sulfuric, etc., are suitable for use in the invention.

The housing of the fuel cell unit should be inert to acid electrolyte. Thus certain metals and coated metals having this property could be used as the housing for the fuel cell. The fuel cell unit is preferably operated at room temperature although it can be operated at about 10° C. to 60° C.; the upper limit of the temperature range being limited by the melting point of the film from the wet proofing material used in preparing the carbon electrode.

What is claimed is:
1. The method of preparing a carbon electrode for use in a fuel cell using an acid electrolyte including the steps of
   (1) weighting the carbon electrode,
   (2) firing the carbon electrode in an oxidizing atmosphere for controlled oxidation of the carbon,
   (3) cooling the carbon electrode,
   (4) reweighing the carbon electrode and determining that a total weight loss of 7 to 10 percent has occurred,
   (5) dusting off the activated electrodes,
   (6) inserting the activated electrodes in a wet proofing solution,
   (7) drying the electrodes with a vacuum pump to insure a dry pore structure,
   (8) heating the wet proofed electrodes in an oven at 200° C. for two hours,
   (9) applying a chloroplatinic acid solution containing about 90 mg. of platinum per ml. of solution on the hot electrode so that one square centimeter of electrode area contains 2 mg. of platinum, and
   (10) placing the electrode in a vacuum oven at 200° C. for six hours.

2. The method of preparing a carbon electrode for use in a fuel cell using an acid electrolyte including the steps of
   (1) weighting the carbon electrode,
   (2) firing the carbon electrode in a carbon dioxide atmosphere at about 800° C. for eight minutes,
   (3) cooling the carbon electrode,
   (4) reweighing the carbon electrode and determining that a total weight loss of 7 to 10 percent has occurred,
   (5) dusting off the activated electrodes,
   (6) inserting the activated electrodes in a wet proofing solution of one gram of paraffin per 100 ml. of petroleum ether,
   (7) drying the electrodes with a vacuum pump for at least 12 hours to insure a dry pore structure,
   (8) heating the wet proofed electrodes in an oven at 200° C. for two hours,
   (9) applying a chloroplatinic acid solution containing about 90 mg. of platinum per ml. of solution on the hot electrode so that one square centimeter of electrode area contains 2 mg. of platinum, and
   (10) placing the electrode in a vacuum oven at 200° C. for six hours.

3. A prepared carbon electrode for use in a fuel cell, said carbon electrode being prepared by the steps including
   (1) weighing the carbon electrode,
   (2) firing the carbon elecetrode in an oxidizing atmosphere for controlled oxidation of the carbon,
   (3) cooling the carbon electrode,
   (4) reweighing the carbon electrode and determining that a total weight loss of 7 to 10 percent has occurred,
   (5) dusting off the activated electrodes,
   (6) inserting the activated electrodes in a wet proofing solution,
   (7) drying the electrodes with a vacuum pump to insure a dry pore structure,
   (8) heating the wet proofed electrodes in an oven at 200° C. for two hours,
   (9) applying a chloroplatinic acid solution containing about 90 mg. of platinum per ml. of solution on the hot electrode so that one square centimeter of electrode area contains 2 mg. of platinum, and
   (10) placing the electrode in a vacuum oven at 200° C. for six hours.

4. A prepared carbon electrode suited for use in a fuel cell, said carbon electrode being prepared by the steps including
   (1) weighing the carbon electrode, (2) firing the carbon electrode in a carbon dioxide atmosphere at about 800° C. for eight minutes,
(3) cooling the carbon electrode,
(4) reweighing the carbon electrode and determining that a total weight loss of 7 to 10 percent has occurred,
(5) dusting off the activated electrodes,
(6) inserting the activated electrodes in a wet proofing solution of one gram of paraffin per 100 ml. of petroleum ether,
(7) drying the electrodes with a vacuum pump for at least 12 hours to insure a dry pore structure,
(8) heating the wet proofed electrodes in an oven at 200° C. for two hours,
(9) applying a chloroplatinic acid solution containing about 90 mg. of platinum per ml. of solution on the hot electrode so that one square centimeter of electrode area contains 2 mg. of platinum, and
(10) placing the electrode in a vacuum oven at 200° C. for six hours.

5. A fuel cell unit using an acid electrolyte, said fuel cell unit comprising
an oxidizing electrode of prepared carbon and means for passing an oxidizing gas to an end face of said oxidizing electrode,
a reducing electrode of prepared carbon and means for passing a fuel gas to an end face of said reducing electrode,
an electrolyte chamber for acid electrolyte disposed between the oxidizing and reducing electrode,
means for passing the acid electrolyte into one end of said electrolyte chamber,
means for passing a mixture of acid electrolyte and cell reaction products out of the other end of said electrolyte chamber, and
where said electrodes are prepared prior to use in the fuel cell by the steps including
   (1) weighing the carbon electrode,
   (2) firing the carbon electrode in a carbon dioxide atmosphere at about 800° C. for eight minutes,
   (3) cooling the carbon electrode,
   (4) reweighing the carbon electrode and determining that a total weight loss of 7 to 10 percent has occurred,
   (5) dusting off the activated electrodes,
   (6) inserting the activated electrodes in a wet proofing solution of one gram of paraffin per 100 ml. of petroleum ether,
   (7) drying the electrodes with a vacuum pump for at least 12 hours to insure a dry pore structure,
   (8) heating the wet proofed electrodes in an oven at 200° C. for two hours,
   (9) applying a chloroplatinic acid solution containing about 90 mg. of platinum per ml. of solution on the hot electrode so that one square centimeter of electrode area contains 2 mg. of platinum, and
   (10) placing the electrode in a vacuum oven at 200° C. for six hours.

References Cited in the file of this patent
UNITED STATES PATENTS
2,384,463    Gunn et al. _____ Sept. 11, 1945
FOREIGN PATENTS
233,847    Australia _____ May 17, 1961